(12) United States Patent
Satou et al.

(10) Patent No.: US 7,205,038 B2
(45) Date of Patent: *Apr. 17, 2007

(54) OPTICAL RECORDING MEDIUM AND METHOD FOR MANUFACTURING THE SAME

(75) Inventors: Junichi Satou, Tokyo (JP); Mamoru Usami, Tokyo (JP); Yoshimi Sakai, Tokyo (JP)

(73) Assignee: TDK Corporation (JP)

( * ) Notice: Subject to any disclaimer, the term of this patent is extended or adjusted under 35 U.S.C. 154(b) by 365 days.

This patent is subject to a terminal disclaimer.

(21) Appl. No.: 10/860,802

(22) Filed: Jun. 2, 2004

(65) Prior Publication Data

US 2005/0271855 A1 Dec. 8, 2005

(51) Int. Cl.
*B32B 3/02* (2006.01)

(52) U.S. Cl. ............... 428/64.1; 428/64.4; 430/270.11; 427/425

(58) Field of Classification Search ............... 428/64.4; 430/270.11; 427/425
See application file for complete search history.

(56) References Cited

U.S. PATENT DOCUMENTS 5,820,961 A * 10/1998 Maruyama et al. ........ 428/64.1
5,972,457 A * 10/1999 Matsuishi et al. ......... 428/64.1
6,846,541 B1 * 1/2005 Oshima ..................... 428/64.1
2003/0067864 A1 * 4/2003 Kikuchi et al. ............. 369/283
2005/0053749 A1 * 3/2005 Usami et al. .............. 428/64.4
2005/0238837 A1 * 10/2005 Satou et al. ............... 428/64.4

* cited by examiner

*Primary Examiner*—Elizabeth Mulvaney
(74) *Attorney, Agent, or Firm*—Young Law Firm, P.C.

(57) ABSTRACT

A method for manufacturing an optical recording medium of the present invention includes the steps of forming an underlying layer having a brightness of 8 or more and a chroma of 4 or less on a label surface of a disk body by a spin coating process, and forming an ink-receiving layer on the underlying layer. In the present invention, the underlying layer having a brightness of 8 or more and a chroma of 4 or less is formed by a spin coating process, thereby significantly decreasing the surface roughness of the underlying layer. Even if the ink-receiving layer is formed by the spin coating or slit coating process in which the surface quality of the underlying layer is greatly reflected, therefore, the average surface roughness (Ra) of the ink-receiving layer can be significantly decreased. Thus, printing by an ink jet printer can produce a color and brilliance close to those of a silver salt photograph.

17 Claims, 7 Drawing Sheets

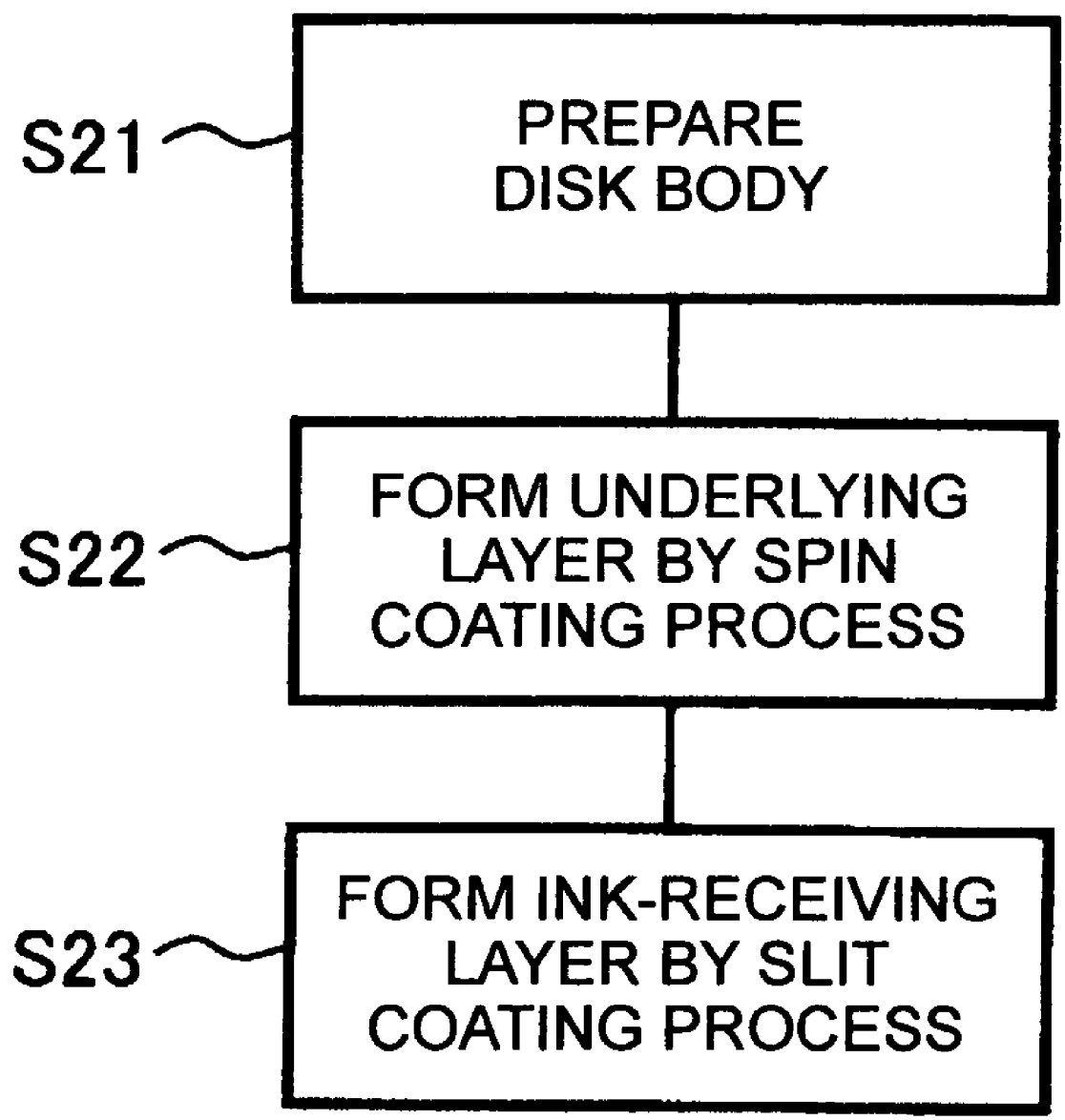

OPTICAL RECORDING MEDIUM AND METHOD FOR MANUFACTURING THE SAME

TECHNICAL FIELD

The present invention relates to an optical recording medium and a method for manufacturing the same, and particularly to an optical recording medium and a method for manufacturing the same permitting printing on a label surface opposite to a light incidence surface.

BACKGROUND ART

In recent years, optical recording media such as CDs (Compact Disc) and DVDs (Digital Versatile Disc) have been widely used as recording media for recording large volumes of digital data. In particular, optical recording media capable of data recording by users have been rapidly popularized. The use of recordable optical recording media enables the simple and inexpensive storage of digital data of large file size, such as picture data and music data. Therefore, the recordable recording media are used by many users. The popularization of such types of optical recording media has increased the demand for manufacture of an original optical recording medium in which a print is provided on a surface (referred to as a "label surface" hereinafter) opposite to a light incidence surface by a printer. Optical recording media capable of realizing the manufacture of original recording media have already been developed and sold.

Such optical recording media include ink-receiving layers provided on the label surfaces, for fixing ink. The ink-receiving layers can be supplied with ink by an ink-jet printer to provide a print on the label surfaces.

However, printability of optical recording media is generally lower than that of glossy paper. There is thus the problem of failing to sufficiently utilize the performance of an ink jet printer capable of high-quality printing. In order to solve this problem, Japanese Unexamined Patent Application Publication No. 2002-237103 proposes an optical recording medium comprising an ink-receiving layer having surface roughness decreased to a predetermined value or less.

In order to decrease the surface roughness of the ink-receiving layer, it is thought to be desirable for the ink-receiving layer to be formed by a spin coating method. In this case, the surface roughness of the ink-receiving layer is influenced by an underlying layer. Even if a coating solution for achieving a smooth surface is selected, the surface roughness of the formed ink-receiving layer is not necessarily decreased. There is thus the problem of failing to achieve high printability.

When the ink-receiving layer is formed by the spin coating method as described above, it is not necessarily easy to decrease the surface roughness.

SUMMARY OF THE INVENTION

Accordingly, an object of the present invention is to provide an optical recording medium in which the surface roughness of an ink-receiving layer is securely decreased to permit high-quality printing on the ink-receiving layer, and to provide a method for manufacturing the optical recording medium.

A method for manufacturing the optical recording medium comprises the steps of forming an underlying layer having a brightness of 8 or more and a chroma of 4 or less on a label surface of a disk body by a spin coating process, and forming an ink-receiving layer on the underlying layer.

In the present invention, the underlying layer having a brightness of 8 or more and a chroma of 4 or less is formed by the spin coating process, and thus the surface roughness of the underlying layer can be significantly decreased. Even if the ink-receiving layer is formed by the spin coating process or slit coating process in which the surface quality of the underlying layer is greatly reflected, the average surface roughness (Ra) of the ink-receiving layer can be significantly decreased. Therefore, printing by the ink jet printer can produce a color and brilliance close to those of silver salt photographs.

The manufacturing method can produce an optical recording medium comprising a disk body, an underlying layer covering the label surface of the disk body up to the periphery thereof, and an ink-receiving layer covering the underlying layer, wherein the underlying layer has a brightness of 8 or more and a chroma of 4 or less.

According to the present invention, the underlying layer having a brightness of 8 or more and a chroma of 4 or less covers the label surface of the disk body up to the periphery thereof, thereby maximizing a printing area.

The step of forming the ink-receiving layer is preferably performed by a spin coating process. This process is capable of forming the ink-receiving layer to cover the label surface of the disk body up to the periphery thereof, thereby forming a printing surface extending to the periphery of the label surface.

The step of forming the ink-receiving layer may be performed by the slit coating process. In this case, the ink-receiving layer does not necessarily completely cover the label surface of the disk body up to the periphery thereof. However, the underlying layer covers the label surface up to the periphery thereof, and thus the ink-receiving layer can be formed up to a region near the periphery of the label surface. In this case, thereof, a printing surface can be sufficiently increased.

Examples of colors having a brightness of 8 or more and a chroma or 4 or less include white (hue: N, brightness: 9.5, chroma: 0 (designated by the Munsell system, this designation applying to the description below)), snow white (hue: N, brightness: 9.5, chroma: 0), baby pink (hue: 4R, brightness: 8.5, chroma: 4.0), shell pink (hue: 10R, brightness: 8.5, chroma: 3.5), nail pink (hue: 10R, brightness: 8.0, chroma: 4.0), peach (hue: 3YR, brightness: 8.0, chroma: 3.5), ecru beige (hue: 7.5YR, brightness: 8.5, chroma: 4.0), leghorn (hue: 2.5Y, brightness: 8.0, chroma: 4.0), cream yellow (hue: 5Y, brightness: 8.5, chroma: 3.5), ivory (hue: 2.5Y, brightness: 8.5, chroma: 1.5), cool white (hue: 10PB, brightness: 9.5, chroma: 0.5), and cherry blossom (hue: 10RP, brightness: 9.0, chroma: 2.5).

In the present invention, the underlying layer preferably has a brightness 9 or more and a chroma of 3 or less. The underlying layer having a brightness of 9 or more and a chroma or 3 or less can achieve high printability. Examples of colors having a brightness of 9 or more and a chroma of 3 or less include white (hue: N, brightness: 9.5, chroma: 0), snow white (hue: N, brightness: 9.5, chroma: 0), cool white (hue: 10PB, brightness: 9.5, chroma: 0.5), and cherry blossom (hue: 10RP, brightness: 9.0, chroma: 2.5).

In the present invention, the underlying layer more preferably has a brightness of 9.2 or more and a chroma of 0.5 or less. The underlying layer having a brightness of 9.2 or more and a chroma of 0.5 or less can achieve higher printability. Examples of colors having a brightness of 9.2 or more and a chroma of 0.5 or less include white (hue: N, brightness: 9.5, chroma: 0), snow white (hue: N, brightness: 9.5, chroma: 0), and cool white (hue: 10PB, brightness: 9.5, chroma: 0.5).

In the present invention, the underlying layer preferably has an average surface roughness (Ra) of 0.1 µm or less.

Also, the ink-receiving layer preferably has an average surface roughness (Ra) of 0.1 µm or less.

The disk body preferably comprises a light-transmissive substrate, a protective layer, and a functional layer provided between the light-transmissive substrate and the protective layer, the light-tranamissive substrate having a thickness larger than that of the protective layer. The optical recording medium having the above-described structure is a so-called CD-type optical recording medium.

Alternatively, the disk body preferably comprises a light-transmissive substrate, a support substrate, and a functional layer provided between the light-transmissive substrate and the support substrate, the light-transmissive substrate having substantially the same thickness as that of the support substrate. The optical recording medium having the above-described structure is a so-called DVD-type optical recording medium. The support substrate used in the DVD-type optical recording medium may be referred to as a "dummy substrate".

Alternatively, the disk body preferably comprises a light-transmissive layer, a support substrate, and a functional layer provided between the light-transmissive layer and the support substrate, the light-transmissive layer having a thickness smaller than that of the support substrate. The optical recording medium having the above-described structure is a so-called next-generation optical recording medium.

The functional layer preferably includes a recording layer. This optical recording medium enables the user to record data, and thus effectively exhibits the characteristic of the optical recording medium of the present invention in that a high-quality print can be provided on a label surface. In this case, like in a recordable optical recording medium, the recording layer may contain an organic dye or an inorganic material. Like in a rewritable optical recording medium, the recording layer may contain a phase change material.

In the present invention, the underlying layer having a brightness of 8 or more and a chroma of 4 or less is formed by the spin coating process, and thus the surface roughness of the underlying layer can be significantly decreased. Therefore, even when the ink-receiving layer is formed by the spin coating process or slit coating process in which the surface quality of the underlying layer is greatly reflected, the surface roughness of the ink-receiving layer can be significantly decreased. In printing by an ink jet printer, therefore, a color and brilliance close to those of a silver salt photograph can be obtained. Furthermore, the underlying layer can be formed to cover the label surface of the disk body up to the periphery thereof, thereby maximizing a printing surface.

BRIEF DESCRIPTION OF THE DRAWINGS

FIG. 8 is a flow chart showing a method for manufacturing an optical recording medium according to a further preferred embodiment of the present invention.

BEST MODE FOR CARRYING OUT THE INVENTION

Preferred embodiments of the present invention will be described in detail below with reference to the attached drawings.

Figure 1:
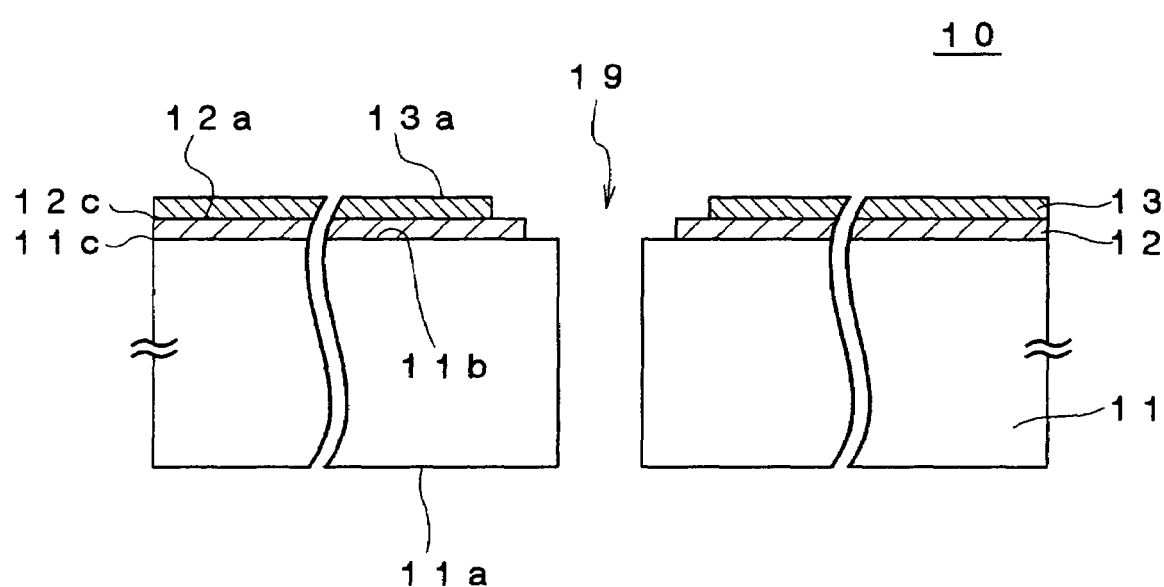
FIG. 1 is a sectional view schematically showing the structure of an optical recording medium according to a preferred embodiment of the present invention.

FIG. 1 is a sectional view schematically showing the structure of an optical recording medium according to a preferred embodiment of the present invention.

As shown in FIG. 1, an optical recording medium 10 according to this embodiment comprises a disk body 11 having a central hole 19, an underlying layer 12 provided on a label surface 11*b* of the disk body 11, and an ink-receiving layer 13 provided on the underlying layer 12.

The disk body 11 has a light incidence surface 11*a* to which a laser beam is applied during recording and/or reproduction, and the label surface 11*b* at the back thereof. The type of the disk body 11 is not particularly limited, and any of CD-type disks such as a CD-ROM type, a CD-R type, and a CD-RW type; DVD-type disks such as a DVD-ROM type, a DVD-R type, and a DVD-RW type; and next-generation optical disks using a laser beam in the blue wavelength region can be used.

FIG. 2 is a drawing showing examples of the disk body 11 to which the present invention is suitably applied. FIGS. 2(*a*), 2(*b*), and 2(*c*) show cross sections of a CD-type disk, a DVD-type disk, and a next-generation disk, respectively.

As shown in FIG. 2(*a*), the CD-type disk comprises a light-transmissive substrate 21 having a surface functioning as the light incidence surface 11*a* and having a thickness of about 1.2 mm, a functional layer 22 provided on the other surface of the light-transmissive substrate 21, and a protective layer 23 covering the functional layer 22 and having a thickness of about 10 µm. The surface of the protective layer 23 functions as the label surface 11*b*. Therefore, when the CD-type disk shown in FIG. 2(*a*) is used as the disk body 11, the underlying layer 12 and the ink-receiving layer 13 are provided on the surface (the label surface 11*b*) of the protective layer 23. Since the protective layer 23 is used as a base of the underlying layer 12, the average roughness (Ra) of the surface (the label surface 11*b*) is preferably as small as possible, and more preferably 0.1 µm or less. The surface roughness of 0.1 µm or less can easily be achieved by a spin coating process for forming the protective layer 23.

As a material for the light-transmissive substrate 21, a resin is preferably used from the viewpoint of ease of formation. Examples of the resin used for the light-transmissive substrate 21 include a polycarbonate resin, an olefin resin, an acrylic resin, an epoxy resin, a polystyrene resin, a polyethylene resin, a polypropylene resin, a silicone resin, a fluorocarbon resin, an ABS resin, and a urethane resin. Among these resins, particularly, a polycarbonate resin or an olefin resin is preferably used because it has excellent optical properties and processability.

Figure 3:
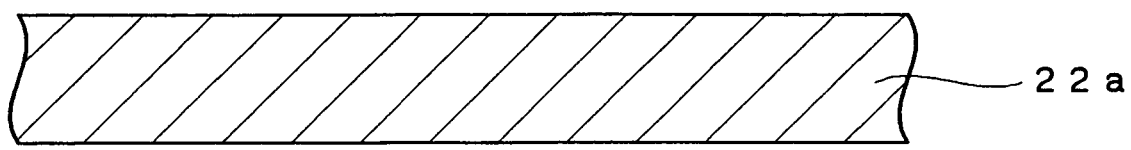
FIG. 3 is a schematic sectional view showing the structure of a functional layer in a ROM disk.
Figure 4:
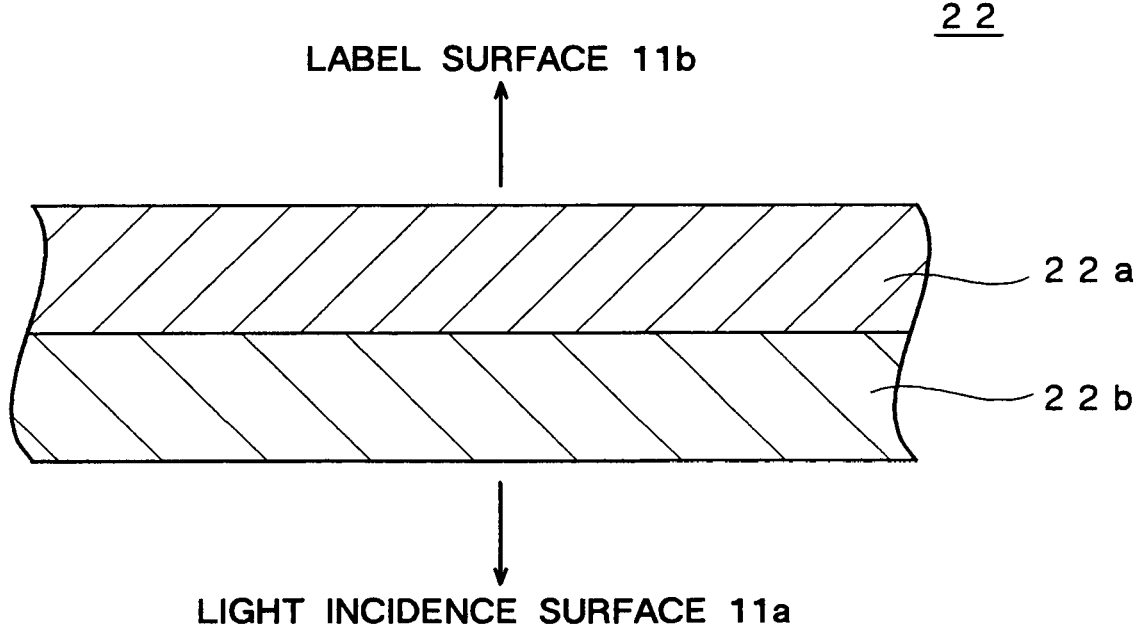
FIG. 4 is a schematic sectional view showing the structure of a functional layer in a recordable disk.
Figure 5:
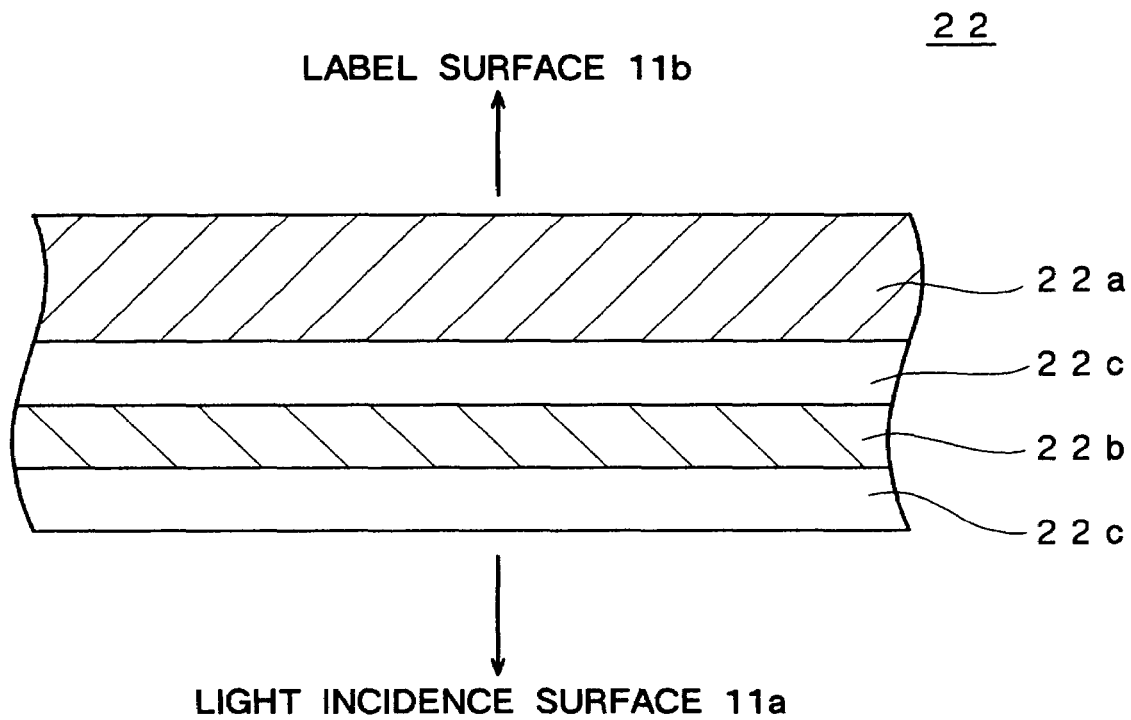
FIG. 5 is a schematic sectional view showing the structure of a functional layer in a rewritable disk.

The structure and material of the functional layer 22 depend upon the type of disk used. In a ROM disk such as a CD-ROM disk, the functional layer 22 generally comprises a reflective layer 22a containing a metal, as shown in FIG. 3. In a recordable disk such as a CD-R disk, the functional layer 22 generally comprises a recording layer 22b containing an organic dye, and a reflective layer 22a containing a metal and provided on the recording layer 22b, as shown in FIG. 4. In a rewritable disk such as a CD-RW disk, the functional layer 22 generally comprises a recording layer 22b containing a phase change material, a plurality of dielectric layers 22c holding the recording layer 22b therebetween, and a reflective layer 22a containing a metal, as shown in FIG. 5. However, the present invention is aimed at an optical recording medium permitting printing on the label surface, and thus the present invention is suitably applied to the recordable disk (FIG. 4) and the rewritable disk (FIG. 5).

Figure 2A:
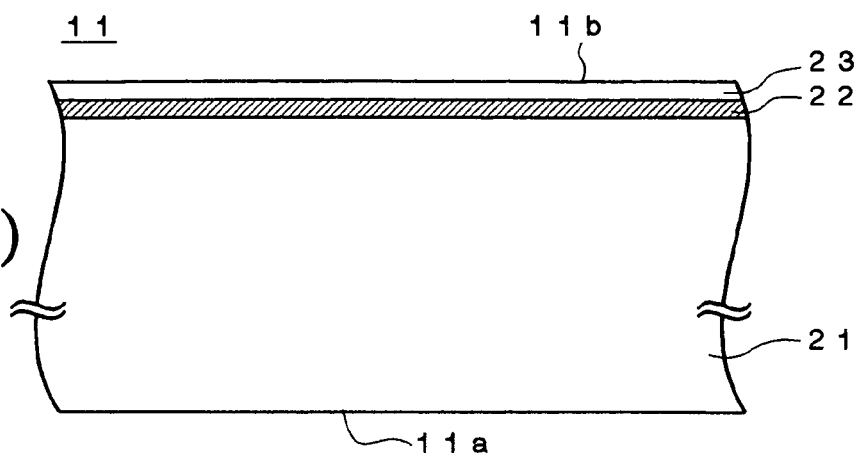
FIG. 2 is a drawing showing examples of a disk body to which the present invention is suitably applied, FIGS. 2(*a*), 2(*b*), and 2(*c*) showing cross sections of a CD-type disk, a DVD-type disk, and a next-generation disk, respectively.
Figure 2B:
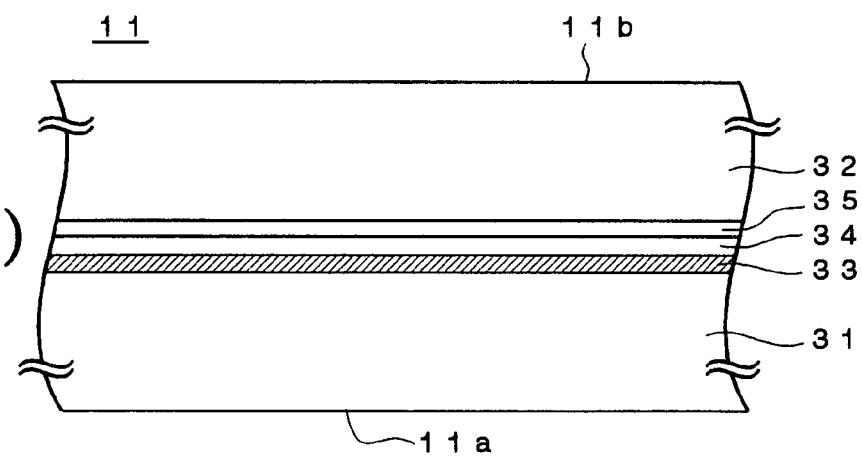

As shown in FIG. 2(b), the DVD-type disk comprises a light-transmissive substrate 31 having a thickness of 0.6 mm and having a surface functioning as the light incidence surface 11a, a support substrate (dummy substrate) 32 having a thickness of about 0.6 mm and having a surface functioning as the label surface 11b, a functional layer 33 provided on the other surface of the light-transmissive substrate 31, a protective layer 34 covering the functional layer 33, and an adhesive layer 35 for bonding a laminate including the light-transmissive substrate 31, the functional layer 33, and the protective layer 34 to the support substrate 32. Therefore, when the DVD-type disk shown in FIG. 2(b) is used as the disk body 11, the underlying layer 12 and the ink-receiving layer 13 are provided on the surface (the label surface 11b) of the support substrate 32. Since the support substrate 32 is used as a base of the underlying layer 12, the average roughness (Ra) of the surface (the label surface 11b) is preferably as small as possible, and more preferably 0.1 µm or less. The surface roughness of 0.1 µm or less can easily be achieved by injection for forming the support substrate 32.

The structure and material of the functional layer 33 depend upon the type of disk used. Like in the CD-type disk, in a ROM disk such as a DVD-ROM disk, the functional layer 33 generally comprises a reflective layer containing a metal (refer to FIG. 3). In a recordable disk such as a DVD-R disk, the functional layer 33 generally comprises a recording layer containing an organic dye and a reflective layer containing a metal and provided on the recording layer (refer to FIG. 4). In a rewritable disk such as a DVD-RW disk, the functional layer 33 generally comprises a recording layer containing a phase change material, a plurality of dielectric layers holding the recording layer therebetween, and a reflective layer containing a metal (refer to FIG. 5). As materials for the light-transmissive substrate 31 and the support substrate 32, the same materials as the above-described preferred examples of the material of the light-transmissive substrate 21 can be used.

Figure 2C:
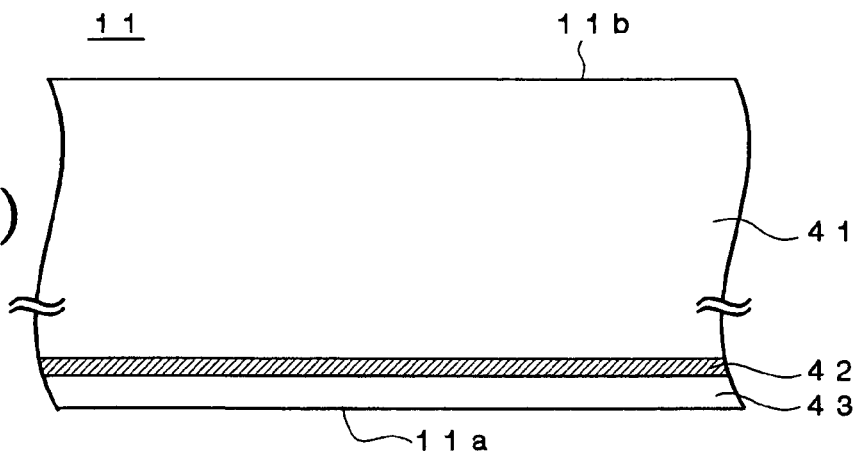

As shown in FIG. 2(c), the next-generation disk comprises a support substrate 41 having a thickness of about 1.1 mm and having a surface functioning as the label surface 11b, a functional layer 42 provided on the other surface of the support substrate 41, and a light-transmissive layer 43 covering the functional layer 42 and having a thickness of about 0.1 mm. The surface of the light-transmissive layer 43 functions as the light incidence surface 11a. Therefore, when the next-generation disk shown in FIG. 2(c) is used as the disk body 11, the underlying layer 12 and the ink-receiving layer 13 are provided on the surface (the label surface 11b) of the support substrate 41. Since the support substrate 41 is used as a base of the underlying layer 12, the average roughness (Ra) of the surface (the label surface 11b) is preferably as small as possible, and more preferably 0.1 µm or less. The surface roughness of 0.1 µm or less can easily be achieved by injection for forming the support substrate 41.

The structure and material of the functional layer 42 depend upon the type of disk used. A currently proposed rewritable disk comprises a recording layer containing a phase change material, a plurality of dielectric layers holding the recording layer therebetween, and a reflective layer containing a metal (refer to FIG. 5). As a material for the support substrate 41, the same materials as the above-described preferred examples of the material of the light-transmissive substrate 21 can be used.

Any one of the disks shown in FIGS. 2(a) to 2(c) has a thickness of about 1.2 mm and a diameter of about 120 mm, but a disk to which the present invention can be applied is not limited to these disks. Namely, any type of disk may be used as long as it has the light incidence surface 11a and the label surface 11b opposite thereto. Furthermore, the outer surface is not necessarily disk-shaped, and the light incidence surface 11a and the label surface 11b may be of a rectangular shape.

The underlying layer 12 functions as a base of the ink-receiving layer 13, for mainly improving color development to improve print quality. As a material for the underlying layer 12, an ultraviolet curable resin, particularly an ultraviolet curable acrylic resin having a low shrinkage rate, is preferably used. In this embodiment, a white pigment is added to the underlying layer 12 to color it white (hue: N, brightness: 9.5, chroma: 0). Preferred examples of the white pigment include titanium oxide, zinc oxide, aluminum oxide, aluminum hydroxide, white lead (basic lead carbonate), strontium titanate, calcium carbonate, mica, barium sulfate, silica, talc, kaoline clay, pyrophyllite clay, and zeolite. In particular, titanium oxide is most preferably selected because it has a high refractive index and can generate a color even when used in a small amount.

The particle size of the white pigment is preferably as small as possible for decreasing the surface roughness. Specifically, the particle size is preferably 0.1 µm to 1.0 µm. When titanium oxide is used as the white pigment, the particle size is preferably 0.1 µm to 0.3 µm. The amount of the white pigment added is preferably about 2 wt % to 20 wt % on the basis of the ultraviolet curable resin. This is because when an amount of less than 2 wt % is added, a whitening effect cannot be sufficiently obtained, while when an amount of over 20 wt % is added, smoothness decreases, and ultraviolet curing is inhibited. In addition, another color pigment, organic pigment or dye may be combined for controlling the shade of white.

The average roughness (Ra) of the surface 12a of the underlying layer 12 is preferably 0.1 µm or less. Although not particularly limited, the thickness of the underlying layer 12 is preferably set to 8 µm to 15 µm. Since the underlying layer 12 is formed by a spin coating process, as described below, the label surface 11b of the disk body 11 is covered with the underlying layer 12 up to a periphery 11c thereof, as shown in FIG. 1.

The ink-receiving layer 13 constitutes one of the outermost layers of the optical recording medium 10, and is provided on the underlying layer 12. The ink-receiving layer 13 functions to receive and fix an ink supplied from an ink jet printer. As a material for the ink-receiving layer 13, a material containing a hydrophilic resin such as polyvinyl alcohol or polyvinyl acetal as a main component, and a cationic polymer functioning as an ink fixing agent is preferably used.

The smaller the average roughness (Ra) of the surface 13a of the ink-receiving layer 13, the more the print quality achieved by a printer, particularly color and brilliance, is improved. In order to obtain a color and brilliance close to those of a silver salt photograph, i.e., photographic image quality, the average roughness (Ra) of the surface 13a of the ink-receiving layer 13 is preferably 0.1 μm or less. Although not particularly limited, the thickness of the ink-receiving layer 13 is preferably set to 10 μm to 30 μm. Since, in this embodiment, the ink-receiving layer 13 is also formed by a spin coating process, as described below, the surface 12a of the underlying layer 12 is covered with the ink-receiving layer 13 up to a periphery 12c thereof, as shown in FIG. 1.

Next, a method for manufacturing the optical recording medium 10 of this embodiment will be described.

Figure 6:
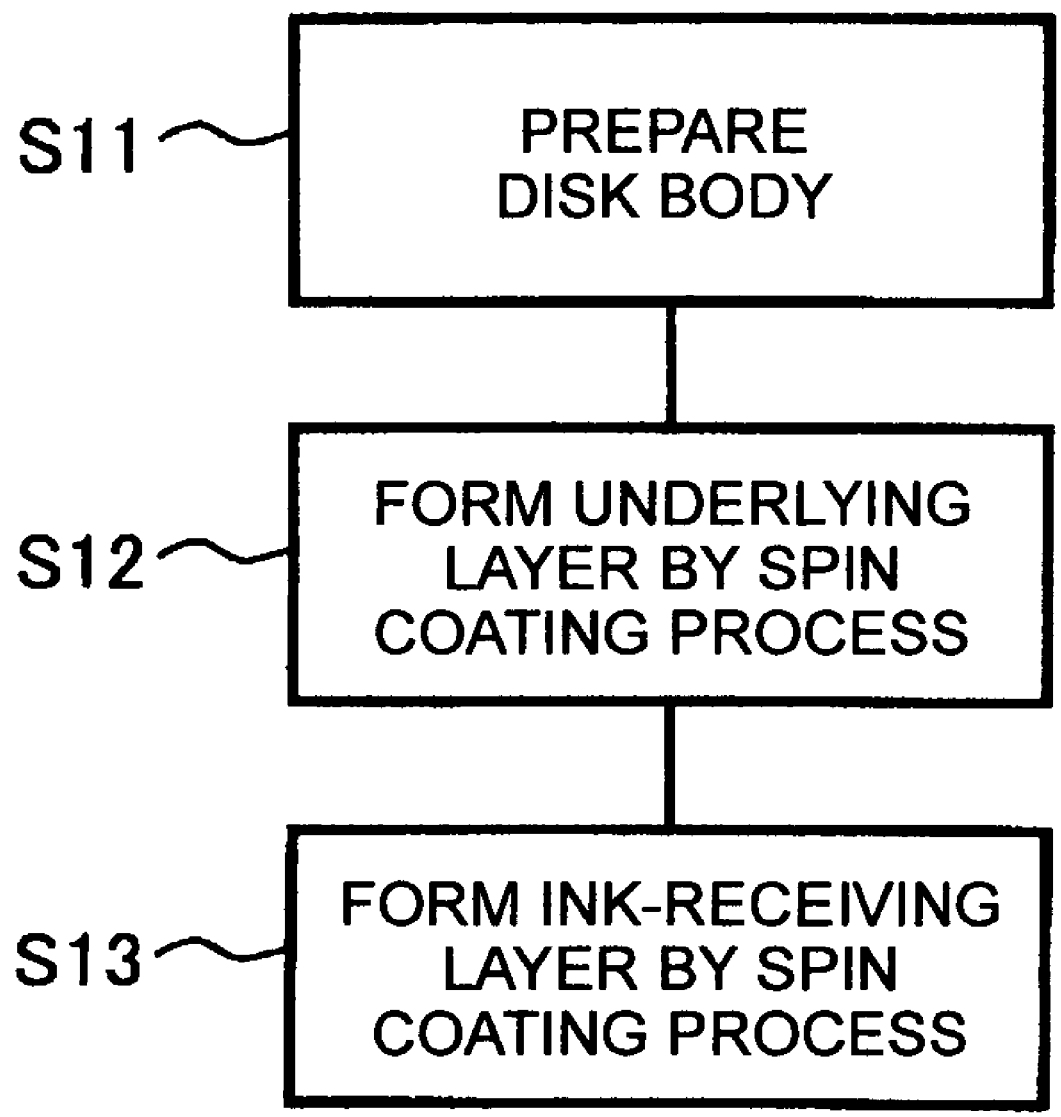
FIG. 6 is a flow chart showing a method for manufacturing an optical recording medium according to a preferred embodiment of the present invention.

FIG. 6 is a flow chart showing a method for manufacturing the optical recording medium according to a preferred embodiment of the present invention.

First, the disk body 11 is prepared (Step S11). As described above, the CD-type disk (refer to FIG. 2(a)), the DVD-type disk (refer to FIG. 2(b)), or the next-generation disk (refer to FIG. 2(c)) can be used as the disk body 11.

Next, the underlying layer 12 is formed on the label surface 11b of the disk body 11 (Step S12). In the present invention, the underlying layer 12 is formed by a spin coating process. As is well known, the spin coating process comprises dropwisely adding a coating solution to the center of the surface (11b) of a treatment object (the disk body 11) or the vicinity thereof, and rotating the treatment object to spread the coating solution in the peripheral direction by centrifugal force. By using the spin coating process, the average roughness (Ra) of the surface 12a of the underlying layer can be decreased, and the label surface 11b of the disk body can be covered with the underlying layer 12 up to the periphery 11c thereof.

As the coating solution for the spin coating process, a solution containing the ultraviolet curable resin and the white pigment is used.

The ultraviolet curable resin preferably has a viscosity of 500 mP·s or less. As the ultraviolet curable resin, a colorless transparent resin such as an acrylic resin is preferably selected. This is because if the ultraviolet curable resin used is yellow, whitening is inhibited. As the ultraviolet curable resin, a material containing a polymerizable oligomer, a photopolymerizable monomer, a photoinitiator, a photoinitiation auxiliary, and other additives can be used.

Preferably, a surfactant is added to the coating solution. The type of surfactant may be appropriately selected according to the types of white pigment used and ultraviolet curable resin used. The concentration of the surfactant is preferably set to 0.1 parts by weight to 0.5 parts by weight on the basis of the ultraviolet curable resin.

The spin coating process tends to increase the thickness distribution of the underlying layer 12, as compared with a screen printing process. However, a desirable film can be formed by using the above-described coating solution, and thus a thickness distribution has substantially no influence on the print quality.

Next, the ink-receiving layer 13 is formed on the surface 12a of the underlying layer 12 (Step S13). In this embodiment, the ink-receiving layer 13 is formed by a spin coating process. By using the spin coating process, the average roughness (Ra) of the surface 13a of the ink-receiving layer 13 can be decreased, and the surface 12b of the underlying layer 12 can be covered with the ink-receiving layer 13 up to the periphery 12c thereof.

When the ink-receiving layer 13 is formed by the spin coating process, the surface quality of the underlying layer is greatly reflected in the ink-receiving layer 13, unlike in the screen printing process. Namely, the average roughness (Ra) of the underlying layer directly appears as the average roughness (Ra) of the surface 12a of the ink-receiving layer 13. In this embodiment, however, the underlying layer 12 formed by the spin coating process is used as the base of the ink-receiving layer 13, and thus the average roughness (Ra) of the surface 12a of the underlying layer can be easily decreased to 0.1 μm or less. Therefore, the average roughness (Ra) of the surface 13a of the ink-receiving layer 13 can also be decreased to 0.1 μm or less. In printing by an ink jet printer, therefore, a color and brilliance close to those of a silver salt photograph can be obtained.

As shown in FIG. 1, the optical recording medium 10 manufactured as descried above comprises the disk body 11 having the label surface 11b which is covered with the underlying layer 12 up to the periphery 11c thereof, the surface 12a of the underlying layer 12 being covered with the ink-receiving layer 13 up to the periphery 12c thereof. Thus, the label surface 11b can be utilized as a printing surface up to the periphery thereof. Namely, frameless printing without a peripheral margin can be performed.

Next, another preferred embodiment of the present invention will be described.

Figure 7:
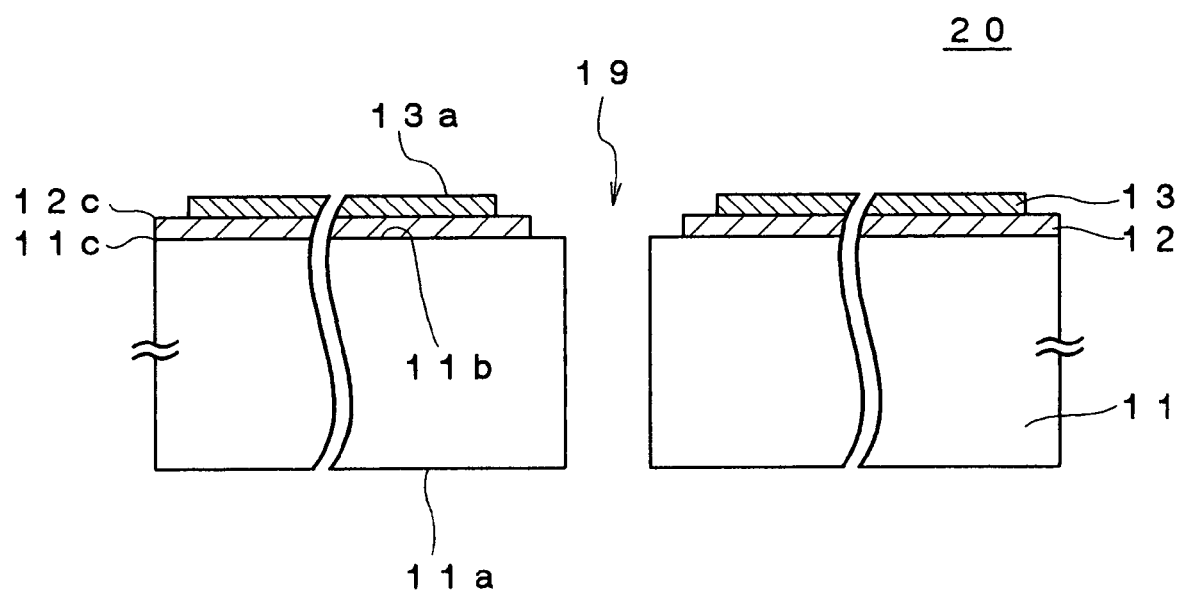
FIG. 7 is a sectional view schematically showing the structure of an optical recording medium according to another preferred embodiment of the present invention.

FIG. 7 is a sectional view schematically showing the structure of an optical recording medium according to another preferred embodiment of the present invention.

As shown in FIG. 7, an optical recording medium 20 of this embodiment is different from the optical recording medium 10 of the above embodiment in that the periphery 12c of the surface 12a of the underlying layer 12 is not covered with the ink-receiving layer 13 to expose the peripheral region of the underlying layer 12. The structures of the other portions are the same as in the optical recording medium 10 of the above embodiment, and duplicated description is omitted.

FIG. 8 is a flow chart showing a method for manufacturing the optical recording medium 20.

First, the disk body 11 is prepared (Step S21), and then the underlying layer 12 is formed on the label surface 11b of the disk body 11 by a spin coating process (Step S22). As described above, by using the spin coating process, the average roughness (Ra) of the surface 12a of the underlying layer can be decreased, and the label surface 11b of the disk body can be covered with the underlying layer 12 up to the periphery 11c thereof.

Next, the ink-receiving layer 13 is formed on the surface 12a of the underlying layer 12 (Step S23). In this embodiment, the ink-receiving layer 13 is formed by a slit coating process. The slit coating process comprises supplying a coating solution from a slit provided in a head, and relatively moving the head and a treatment object to spread the coating solution on the surface of the treatment object. The average roughness (Ra) of the surface 13a of the ink-receiving layer 13 can be decreased by using the slit coating process. However, it is difficult to completely align the end of the slit provided in the head with the periphery 12c of the underlying layer 12. Thus, as shown in FIG. 7, the periphery 12c of the surface 12a of the underlying layer 12 is not covered with the ink-receiving layer 13 to expose the peripheral region of the underlying layer 12.

When the ink-receiving layer 13 is formed by the slit coating process, the surface quality of the underlying layer is greatly reflected in the ink-receiving layer 13, unlike in the screen printing process. Namely, the average roughness (Ra) of the underlying layer directly appears as the average roughness (Ra) of the surface 12a of the ink-receiving layer 13. In this embodiment, however, the underlying layer 12 formed by the spin coating process is used as the base of the ink-receiving layer 13, and thus the average roughness (Rn) of the surface 12a of the underlying layer can easily be decreased to 0.1 μm or less. Therefore, the average roughness (Ra) of the surface 13a of the ink-receiving layer 13 can also be decreased to 0.1 μm or less. In printing by an ink jet printer, therefore, a color and brilliance close to that of a silver salt photograph can be obtained.

In the optical recording medium 20 of this embodiment, it is difficult to cover the periphery 12c of the surface 12a of the underlying layer 12 with the ink-receiving layer 13. However, the label surface 11b of the disk body 11 is covered with the underlying layer 12 up to the periphery 11c thereof, and thus the ink-receiving layer 13 can be formed to a region near the periphery 11c of the label surface 11b, thereby sufficiently increasing a printing area.

As described above, in the optical recording medium 10 or 20 of each embodiment, the white-colored underlying layer 12 is formed by the spin coating process, and thus the average roughness (Ra) of the surface 12a can be significantly decreased. Even when the ink-receiving layer 13 is formed by the spin coating process or slit coating process in which the surface quality of the underlying layer is greatly reflected, therefore, the average roughness (Ra) of the surface 13a of the ink-receiving layer 13 can be significantly decreased. In printing by an ink jet printer, therefore, a color and brilliance close to those of a silver salt photograph can be obtained.

The present invention is not limited to the above-described embodiments, and various changes can be made in the scope of the claims of the present invention. Of course, these changes are also included in the scope of the present invention.

For example, in each of the embodiments, the underlying layer 12 is colored white by adding a white pigment. However, the underlying layer 12 may be adjusted to a brightness of 8 or more and a chroma or 4 or less by using a white material for the underlying layer 12 instead of adding the white pigment.

Although, in each of the embodiments, the underlying layer 12 is formed directly on the surface 11b of the disk body 11, another layer may be interposed between the disk body 11 and the underlying layer 12 as long as the surface quality of the disk body is sufficiently reflected in the underlying layer. Similarly, another layer may be interposed between the underlying layer 12 and the ink-receiving layer 13 as long as the surface quality of the underlying layer 12 is sufficiently reflected in the ink-receiving layer 13.

Also, the ink-receiving layer may be formed by a process other than the spin coating process and the slit coating process.

EXAMPLE

Fifteen parts by weight of a white pigment, titanium oxide R-21, produced by Sakai Chemical Co., Ltd., 100 parts by weight of an ultraviolet curable resin, TD1000, produced by Dainippon Ink & Chemicals, Inc., and 0.3 parts by weight of a surfactant, AAB-0851, produced by NOF Corporation were mixed by stirring to prepare a coating solution used as a material for an underlying layer. The prepared coating solution had a viscosity of 1500 mP·s.

On the other hand, a disk-shaped support substrate comprising polycarbonate and having a thickness of about 1.1 mm and a diameter of about 120 mm was formed by injection.

Next, the coating solution was coated on the surface of the support substrate by the spin coating process. The spin conditions of spin coating included a rotational speed of 2500 rpm and a rotational time of 10 seconds. Then, the coating solution was cured by irradiation with ultraviolet rays at 160 W/cm for 10 seconds to form the underlying layer.

The measurement of the hue, brightness, and chroma of the resultant underlying layer showed a hue of N, a brightness of 9.5, and a chroma of 0. The measured surface roughness (Ra) was about 0.05 μm.

Next, 10 wt % to 15 wt % of PVA (polyvinyl alcohol), 75 wt % to 85 wt % of water, 5 wt % to 10 wt % of IPA (isopropyl alcohol), and 5 wt % or less of other materials were mixed to prepare a coating solution (viscosity of 500 mP·s) used as a material for an ink-receiving layer. Then, the coating solution was coated, by the slit coating process, on the surface of the underlying layer in a radius of 20 mm to 58 mm from the center of the support substrate. The head used in the slit coating process had a sector slit having a slit width of 0.08 mm at its end corresponding to the internal periphery of the support substrate and a slit width of 0.12 mm at its other end corresponding to the external periphery. The head was brought to a distance of 0.09 mm from the surface of the underlying layer, and in this state, the support substrate was rotated at 14 rpm. Then, the support substrate was rotated at 100 rpm for 15 seconds to level the coated film which was then dried at 80° C. for 5 minutes, to form an ink-receiving layer of about 10 μm in thickness.

Printing on the ink-receiving layer by an ink jet printer produced a color and brilliance close to those of a silver salt photograph.

What is claimed is:

1. A method for manufacturing an optical recording medium comprising the steps of forming an underlying layer having a brightness of 8 or more, and a chroma of 4 or less, and an average surface roughness (Ra) of 0.1 um or less on a label surface of a disk body by a spin coating process, and forming an ink-receiving layer on the underlying layer.

2. The method for manufacturing the optical recording medium according to claim 1, wherein the underlying layer has a brightness of 9 or more, and a chroma of 3 or less.

3. The method for manufacturing the optical recording medium according to claim 2, wherein the underlying layer 15 has a brightness of 9.2 or more, and a chroma of 0.5 or less.

4. The method for manufacturing the optical recording medium according to claim 1, wherein the ink-receiving layer has an average surface roughness (Ra) of 0.1 μm or less.

5. The method for manufacturing the optical recording medium according to claim 1, wherein the ink-receiving layer is formed by a spin coating process.

6. The method for manufacturing the optical recording medium according to claim 1, wherein the ink-receiving layer is formed by a slit coating process.

7. An optical recording medium comprising a disk body, an underlying layer covering a label surface of the disk body up to its periphery, and an ink-receiving layer covering the underlying layer, wherein the underlying layer has a brightness of 8 or more and a chroma of 4 or less and an average surface roughness (Ra) of 0.1 μm or less.

8. The optical recording medium according to claim 7, wherein the underlying layer has a brightness of 9 or more, and a chroma of 3 or less.

9. The optical recording medium according to claim 8, wherein the underlying layer has a brightness of 9.2 or more, and a chroma of 0.5 or less.

10. The optical recording medium according to claim 7, wherein the ink-receiving layer has an average surface roughness (Ra) of 0.1 μm or less.

11. The optical recording medium according to claim 7, wherein the ink-receiving layer covers the underlying layer up to its periphery.

12. The optical recording medium according to claim 7, wherein the disk body comprises a light-transmissive substrate, a protective layer, and a functional layer disposed between the light-transmissive substrate and the protective layer, the light-transmissive substrate having a thickness larger than that of the protective layer.

13. The optical recording medium according to claim 7, wherein the disk body comprises a light-transmissive substrate, a support substrate, and a functional layer disposed between the light-transmissive substrate and the support substrate, the light-transmissive substrate having substantially the same thickness as that of the support substrate.

14. The optical recording medium according to claim 7, wherein the disk body comprises a light-transmissive layer, a support substrate, and a functional layer disposed between the light-transmissive layer and the support substrate, the light-transmissive layer having a thickness smaller than that of the support substrate.

15. The optical recording medium according to claim 13, wherein the functional layer includes a recording layer.

16. The optical recording medium according to claim 15, wherein the recording layer contains an organic dye.

17. The optical recording medium according to claim 15, wherein the recording layer contains a phase change material.

* * * * *